United States Patent [19]
Rez

[11] Patent Number: 5,106,424
[45] Date of Patent: Apr. 21, 1992

[54] DECONTAMINATION METHOD AND USE OF CONTAMINANT

[75] Inventor: Donald H. Rez, Newport Beach, Calif.

[73] Assignee: Polar Marine Inc., San Marino, Calif.

[21] Appl. No.: 552,942

[22] Filed: Jul. 16, 1990

[51] Int. Cl.$^5$ .............................. B09B 3/00; C04B 7/24
[52] U.S. Cl. ............................................ 134/4; 134/10; 405/128; 405/263; 405/266; 405/258; 405/15; 405/16; 405/17; 210/908; 210/922; 210/923; 106/807; 106/900; 106/647; 106/664; 106/669; 106/718
[58] Field of Search ............... 106/807, 900, 647, 664, 106/669, 718; 210/908, 922, 923; 134/4, 10; 405/128, 258, 263, 266, 15, 16, 17

[56] References Cited

U.S. PATENT DOCUMENTS

| | | | |
|---|---|---|---|
| Re. 27,227 | 11/1971 | Harnsberger | 106/807 |
| 1,000,545 | 8/1911 | Page | 106/807 |
| 3,802,898 | 4/1974 | Laurent et al. | 106/280 |
| 3,868,262 | 2/1975 | Ohlson | 106/286.01 |
| 4,094,697 | 6/1978 | Rostler | 106/280 |
| 4,274,880 | 6/1981 | Chappell | 106/DIG. 1 |
| 4,931,192 | 6/1990 | Convington et al. | 405/129 |

OTHER PUBLICATIONS

Takeshita, Oil-Sludge Solidification, Chemical Abstracts, vol. 92, 1980, p. 308.

Primary Examiner—Theodore Morris
Assistant Examiner—Zeinab El-Arini
Attorney, Agent, or Firm—William W. Haefliger

[57] ABSTRACT

Decontamination of a beach or soil area that has hydrocarbon contamination including removing hydrocarbon contaminated sand or soil from an area; mixing the contaminated soil or sand with cement and water; and forming concrete from the mix.

5 Claims, 2 Drawing Sheets

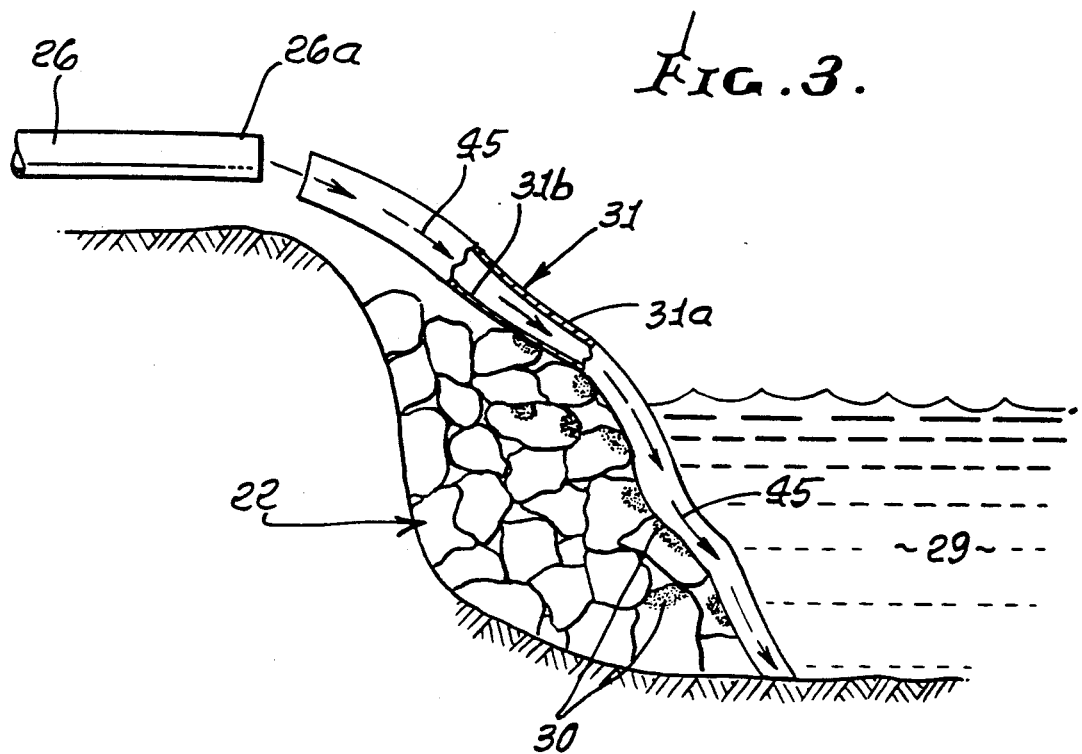
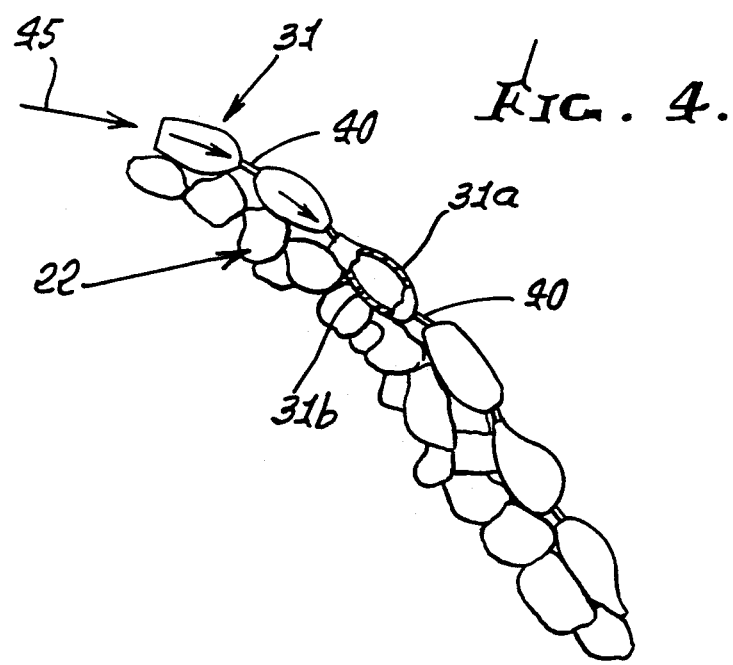

DECONTAMINATION METHOD AND USE OF CONTAMINANT

BACKGROUND OF THE INVENTION

This invention relates generally to decontamination of beach, shore, sumps, dumps and soil areas that has or have hydrocarbon contamination; more specifically, it relates to converting contaminated waste at such areas to useful materials, and the use of such.

Hydrocarbon contamination of beach, shore, and similar areas has recently become more and more of a problem, due for example to spillage and leakage of crude oil and other hydrocarbons from tankers, off-shore oil platforms and facilities, and underground and surface pipe lines, and the like. Much time and great expense are wasted in carrying out state of the art remedies, such as steam-cleaning of rocks, and shore lines, microbiol conversions of crude to $O_2$ and to $CO_2$, and general mop-up, including transporting contaminated soil or sand to remote areas, or encapsulation. There is need for a much more efficient and useful means to decontaminate such areas.

SUMMARY OF THE INVENTION

It is a major object of the invention to provide methods and apparatus fulfilling the above need. As will be seen, the basic method of the invention includes the steps:

a) removing hydrocarbon contaminated sand or soil from the area, b) mixing the contaminated soil or sand with cement, aggregate, and water, and c) forming concrete from the mix. Such concrete contains within itself the objectionable hydrocarbon, removed from the beach sand or other soil areas; and it can then be used for useful purposes, as in production of roadways, blocks, foundations for buildings, etc. In this regard, it is known that high strength concrete can be produced from concrete mixes (sand, aggregate, calcareous cement, admixtures, and water) that also contain oil or bitumen. The contaminated beach sand can be substituted for sand in a conventional concrete mix, after it has been scooped from a beach area, leaving only fresh, uncontaminated sand at the beach.

It is another object of the invention to use the hydrocarbon containing concrete in a way such as will isolate other contaminated areas. Thus, for example, that concrete may then be poured into or over another hydrocarbon contaminated beach or counterpart area, to cure in situ over said contaminated area. That pour area is typically defined by hydrocarbon contaminated rock or the like, as at a sea wall, groin, or spit. The concrete is typically pumped to the rocky area and discharged onto the rock to cover oil contaminated zones and to cure in situ.

A further object is to provide an alternate method to cover or isolate hydrocarbon contaminated rocks or sloping areas adjacent the sea or beach, as by employment of a sleeve overlying the contaminated area, and pumping or discharging the hydrocarbon containing concrete into the sleeve to fill or partially fill same, to cure in situ, whereby the oil contaminated rock is permanently covered. Vegetation may then propagate.

These and other objects and advantages of the invention, as well as the details of an illustrative embodiment, will be more fully understood from the following specification and drawings, in which:

DRAWING DESCRIPTION

FIG. 3 is a view like FIG. 2 showing a concrete pour into a locating or forming sleeve, on the oil contaminated rocky shore; and FIG. 4 is a cross-section through a sleeve that has opposite sheets interconnected at local zones that are spaced apart.

DETAILED DESCRIPTION

Figure 1:
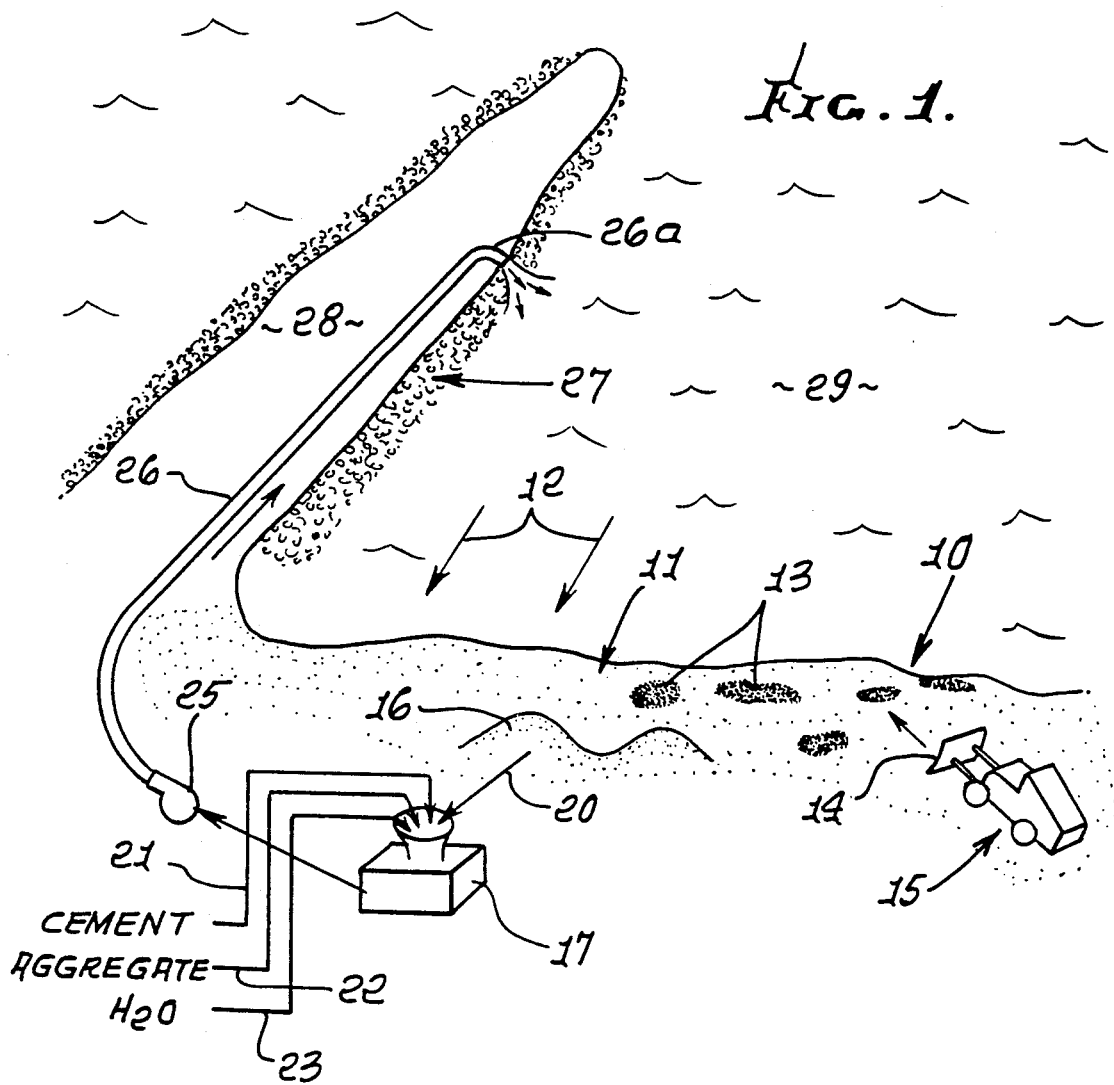
FIG. 1 is perspective view of a sea-shore location, at which contaminated sand is converted to concrete, and also showing use of such concrete to further isolate contaminated area.

In FIG. 1, a shore-line 10 is sandy at 11, and has become crude oil or hydrocarbon contaminated due to on-shore oil wave action, or impingement, as indicated by arrows 12. Note crude patches or zones 13, on or in the sand. A scoop or shovel 14 is moved over the beach, as by tractor 15, to scoop up the contaminated sand into a pile at 16, for example.

A concrete mixer is provided at 17, near the pile 16, and measured quantities of such contaminated sand from the pile are fed at 20 to the mixer. Also fed to the mixer are calcareous cement, at 21; aggregate (rocks, etc.) at 22; and fresh or salt water, at 23. The components fed to the mix are sufficient, and in correct proportion, to form a curable slurry or mixture, and the concrete may be used to form roadways, foundations, building blocks, broken up pieces used as sea barriers, etc. Use of synthetic fiber, such as polypropylene, in the slurry, adds reinforcement and strength.

Figure 2:
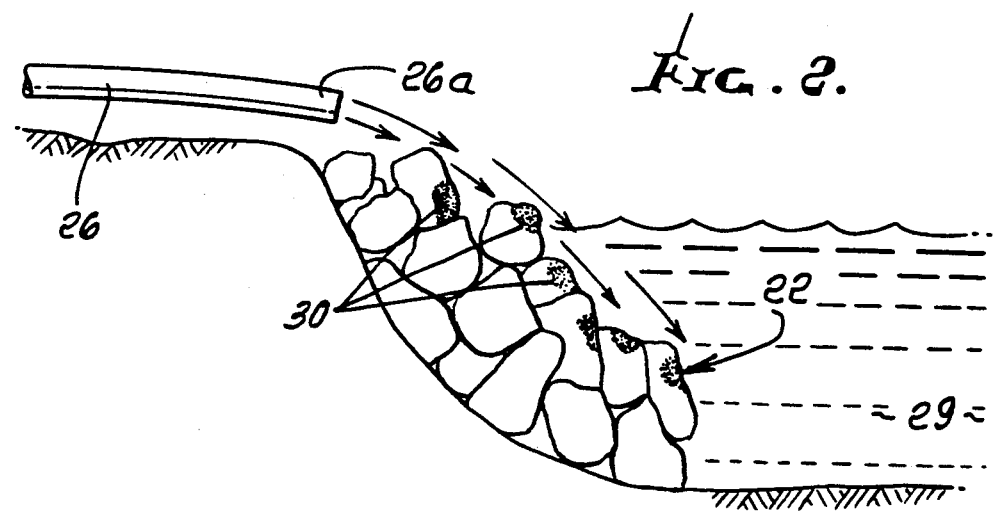
FIG. 2 is an elevation showing a concrete pour onto crude-oil contaminated rocks.

FIG. 1 also shows use of the concrete in the following manner. A pump 25 is operated to pump concrete from the mixer to a tubular line 26, extending to another contaminated shore area, for example rocky area 22 adjacent a groin, spit, wharf, sea-wall, etc. In the example, a groin 28 is shown, extending into the sea 29. Line 26 delivers concrete slurry onto the rocks, as seen in FIG. 2, thereby covering oily patches or zones 30 seen on the rocks. The concrete cures in situ, permanently covering or isolating the oily patches of contamination. Pneumatic transportation of the concrete in line 26 may be employed, and the concrete discharged in a jet, onto the shore area.

In FIG. 3, a plastic, i.e. synthetic resinous sleeve 31 is provided, overlying the rocks and oily patches. Concrete is poured or delivered from end 26a of line 26, into the flexible sleeve, to fall by gravity to lower regions of the sleeve at ocean edge, or below that level. Thus advantage is taken of a gravity-fill, to fill the sleeve with concrete 45 to desired level, and the sleeve is self-supporting on the rocks, and has an undulating appearance due to weight of concrete depressing the sleeve toward crevices between the rocks. Sleeve upper and lower layers or sheets appear at 31a and 31b. The sleeve may consist of biodegradable flexible material, if desired.

In FIG. 4, the sleeve upper and lower sheets are locally interconnected, as by heat bonding, at spaced apart locations 40, allowing concrete to flow within and fill the sleeve, between the interconnection zones, flowing around the latter. Thus, sleeve bulging as it fills with concrete is controlled, as by bulge areas, of controlled thickness. Various means for producing the interconnections may be provided.

The invention, in summary, concerns clean-up of contaminated sand to produce concrete, which can be broken up at an early age to use it to construct stabilizing sea walls on artificial reefs off shore. The crude petroleum will be encapsulated in the concrete, and small amounts possibly released will not upset the ecology any more than the natural seepage from deposits off shore. The formation of reefs can be done by pumping the concrete, adjusted to the most effective weight for casting into preforming molds of a thin strong membrane (bio-degradable if desired) to help anchoring and propagating shapes and structures constructed. To encourage wild life growth on existing jettys or groins, a gunite or pneumatic placed concrete could cover the crude coating on the jettys and to lock it in, allowing immediate return of sea life to the structure.

I claim:

1. The method of decontaminating a beach or soil area at the earth's surface that has hydrocarbon contamination carried by crude oil spillage, that includes
   a) removing hydrocarbon contaminated sand or soil from said area, and leaving only uncontaminated sand or soil at said area, the hydrocarbon including crude oil,
   b) mixing said removed contaminated soil or sand with cement and water,
   c) forming concrete from said mix,
   d) and pouring said concrete into or over another hydrocarbon contaminated beach or earth's surface area, to cure in situ over said area, whereby the contaminated sand and crude oil becomes encapsulated in the cured concrete, said pour area being defined by contaminated rocks,
   e) a flexible plastic sleeve positioned over said area, said concrete being poured into said sleeve, and supporting said sleeve containing said concrete on the said other contaminated area which includes rocks to allow the concrete to cure within said sleeve.

2. The method of claim 1 including forming the concrete into rock-like pieces, for use as a sea wall.

3. The method of claim 1 wherein said concrete is poured into the sleeve which includes interconnecting spaced portions of sheets, thereby to control concrete bulging of the sleeve.

4. The method of claim 1 including operating a mixer for said concrete near said beach area, and pumping said concrete from said mixer to said contaminated rocks and sheets.

5. The method of claim 1 wherein the sleeve consists of biodegradable material.

* * * * *